United States Patent
Olds et al.

(10) Patent No.: US 6,292,659 B1
(45) Date of Patent: Sep. 18, 2001

(54) GLOBAL TELECOMMUNICATIONS SYSTEM WITH DISTRIBUTED VIRTUAL NETWORKS AND METHOD OF OPERATION THEREFOR

(75) Inventors: Keith Andrew Olds, Mesa; John Richard Kane; Vijay Kapoor, both of Phoenix, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/873,877

(22) Filed: Jun. 12, 1997

(51) Int. Cl.[7] .................. H04Q 7/20; H04B 7/185; H04B 7/19

(52) U.S. Cl. .................. 455/427; 455/12.1; 455/13.2; 455/430

(58) Field of Search .................. 455/12.1, 13.1, 455/426, 427, 430, 433, 428, 560

(56) References Cited

U.S. PATENT DOCUMENTS

| | | | |
|---|---|---|---|
| 4,972,456 | * 11/1990 | Kaczmarek et al. | 455/436 |
| 5,355,374 | * 10/1994 | Hester et al. | 370/461 |
| 5,473,608 | 12/1995 | Gagne et al. | 370/85.13 |
| 5,590,395 | * 12/1996 | Diekelman | 455/430 |
| 5,592,470 | * 1/1997 | Rudrapatna et al. | 370/320 |
| 5,612,959 | 3/1997 | Takase et al. | 370/390 |
| 5,625,404 | * 4/1997 | Grady et al. | 348/7 |
| 5,722,042 | * 2/1998 | Kimura et al. | 455/13.1 |
| 5,835,857 | * 11/1998 | Otten | 455/410 |
| 5,842,125 | * 11/1998 | Modzelesky | 455/428 |
| 5,850,602 | * 12/1998 | Tisdale et al. | 455/430 |
| 5,862,478 | * 1/1999 | Cutler, Jr. et al. | 455/430 |
| 5,896,558 | * 4/1999 | Wiedeman | 455/12.1 |
| 5,949,766 | * 9/1999 | Ibanez-Meier et al. | 370/316 |
| 5,956,619 | * 9/1999 | Gallagher et al. | 455/12.1 |
| 5,978,363 | * 11/1999 | Dimitrijevic et al. | 370/319 |
| 6,067,442 | * 5/2000 | Wiedeman et al. | 455/13.1 |
| 6,078,810 | * 6/2000 | Olds et al. | 455/428 |
| 6,112,083 | * 8/2000 | Sweet et al. | 455/426 |
| 6,141,534 | * 10/2000 | Snell et al. | 455/12.1 |

FOREIGN PATENT DOCUMENTS 19627636   6/1997  (DE) .................. H04Q/7/38

OTHER PUBLICATIONS

Article entitled "Supporting ATM On A Low–Earth Orbit Satellite System" David M. Lucantoni and Patrick L. Reilly (Nov. 1995).

* cited by examiner

Primary Examiner—Vivian Chang
Assistant Examiner—Charles N. Appiah
(74) Attorney, Agent, or Firm—Sherry Whitney; Jennifer Wuamett; Frank J. Bogacz

(57) ABSTRACT

In a communication system having Low Earth Orbit (LEO) satellites (210), one or more Mission Operations Control Centers (MOCCs) (220), one or more Distributed Virtual Network Managers (DVNMs) (230), and several types of Customer Premises Equipment (CPE) (250, 260, 270, and 280), individual service providers (20) are able to control the network services they provide independently from other service providers (20) through local management of the DVNMs (230).

9 Claims, 6 Drawing Sheets

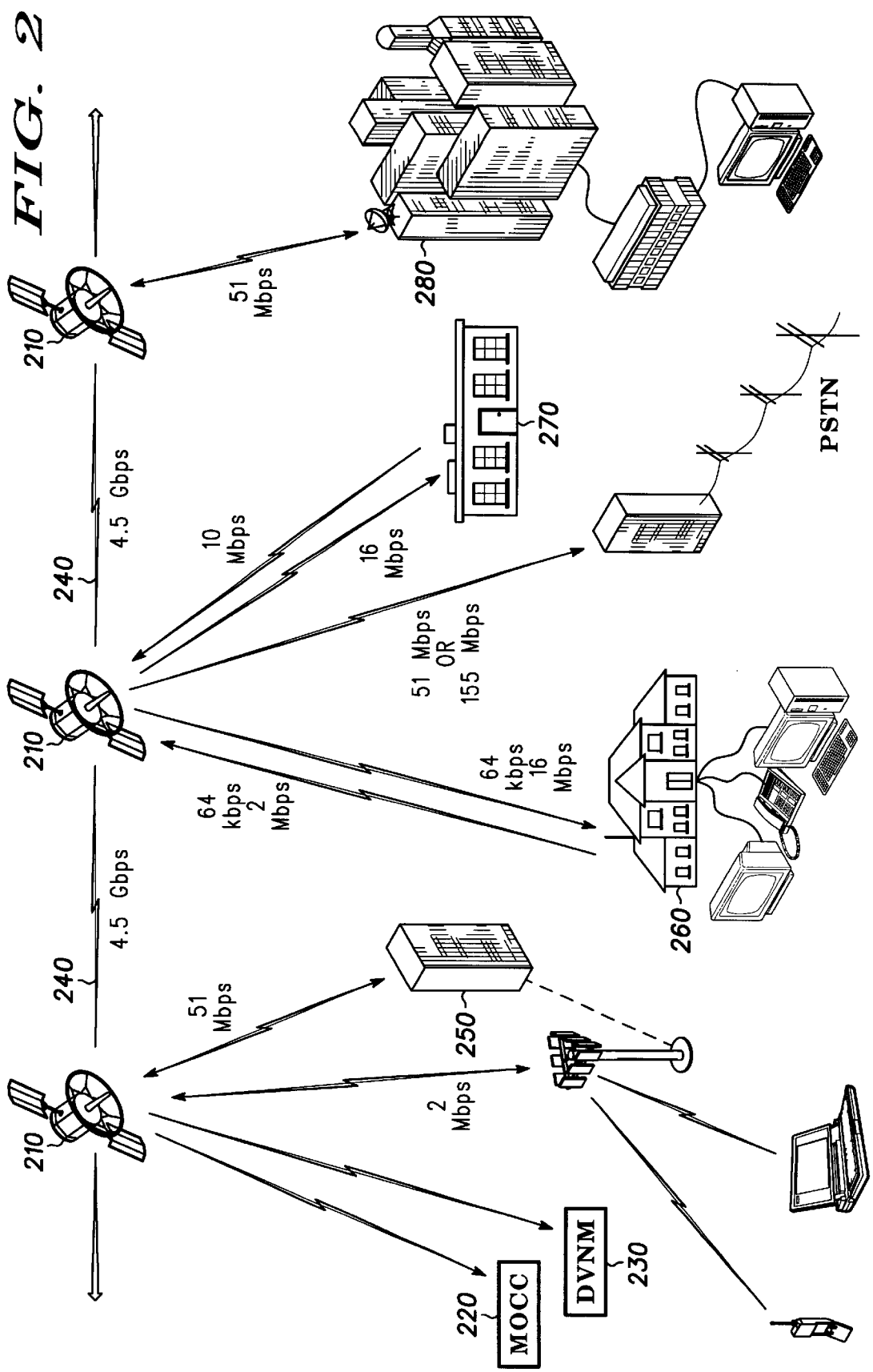

GLOBAL TELECOMMUNICATIONS SYSTEM WITH DISTRIBUTED VIRTUAL NETWORKS AND METHOD OF OPERATION THEREFOR

INCORPORATION BY REFERENCE

The following co-pending application is incorporated herein by reference: "Multi-Tier Satellite Communication System and Method of Operation Thereof" (IRI03730), Ser. No. 08/873,551, filed on Jun. 12, 1997 and assigned to the same assignee as the present application.

FIELD OF THE INVENTION

The present invention relates generally to satellite communication systems and methods, and more particularly to service provider access to satellite communication systems.

BACKGROUND OF THE INVENTION

A typical communication network is managed by a central network operator and a number of distributors. The distributors act as the service providers for the system, and may either wholesale their service capacity to retailers or sell directly to customers.

Services provided on the network are controlled by the central network operator and individual service providers have no ability to control their network services independently from other service providers. Different service providers often sell services to customers having differing service needs. Therefore, service providers desire the ability to independently control the services provided.

What is needed is a method and apparatus which enables individual service providers to independently control network services.

BRIEF DESCRIPTION OF THE DRAWINGS

FIG. 2 illustrates a satellite communication system in accordance with a preferred embodiment of the present invention;

DETAILED DESCRIPTION OF THE DRAWINGS

The method and apparatus of the present invention enables individual service providers to control network services which they provide independently from a system's other service providers. Thus, from the service provider's perspective, the system appears to be a independent network for which the service provider can control system functions such as security, subscriber access, routing, addressing, and offered services.

This illusion of an independent network (referred to hereinafter as a "virtual network") is achieved by employing a system management domain and local management domains. Each service provider is capable of exercising control within a local management domain. The system management domain provides global system control, tying all local management domains together. The system management domain controls the system in a manner that is substantially transparent to the local management domains.

Figure 1:
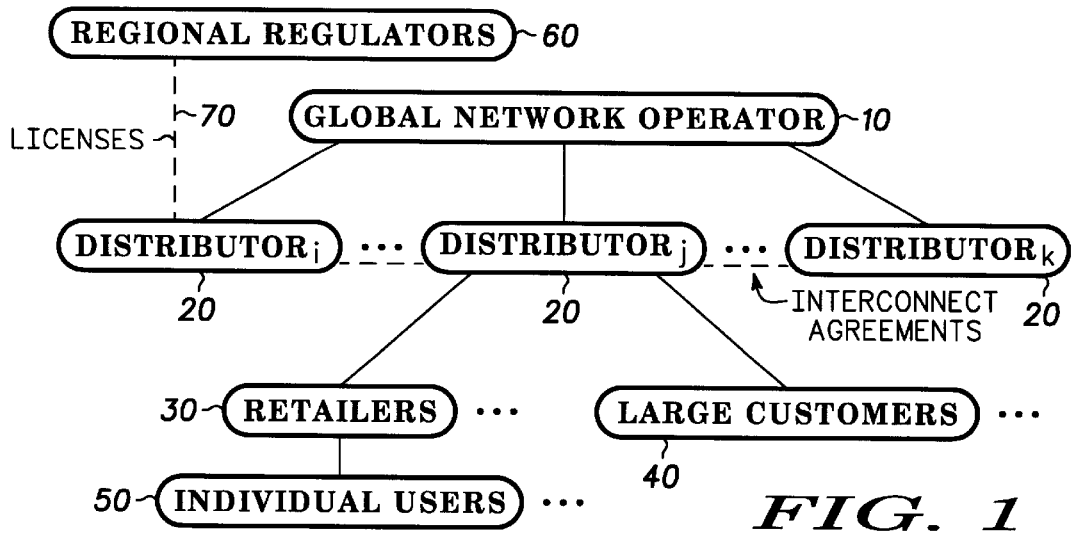
FIG. 1 illustrates the business structure in accordance with a preferred embodiment of the present invention.

In a preferred embodiment, the system architecture is designed to support a hierarchical business structure. FIG. 1 illustrates the business structure in accordance with a preferred embodiment of the present invention. The network is managed by a central global network operator 10 and a number of distributors 20. Each distributor 20 controls an LMD which includes of a distributed virtual network (DVN).

The distributors are the service providers for the system, and may either wholesale their service capacity to retailers or they may sell directly to large customers. A distributor could function as both a wholesaler and a retailer.

In a preferred embodiment, as many of the system functions as possible will be performed in the ground equipment to limit the satellite complexity. Communications operations, management, and service functions may be viewed as software-based applications distributed over multiple nodes of a network. The information networking architecture for the method and apparatus of the present invention embodies a distributed application platform for building and executing network wide applications.

This distributed platform hides the applications from the effects introduced by distribution, and from the complexities of the underlying network resources. This idea is especially useful in a system where the basic network functions such as addressing and routing should be isolated from the dynamics of the LEO constellation to the maximum extent possible.

In a preferred embodiment, the method and apparatus of the present invention includes a Low Earth Orbiting (LEO) satellite network that provides high data rate transmission with low transit delays over the populated areas of the Earth's surface.

The method and apparatus of the present invention provides fixed satellite services with a variety of user data rates to small, very small, and ultra-small satellite earth terminals. It also provides high data rate connections to gateway earth terminals that interface to the public switched telephone network (PSTN).

FIG. 2 illustrates a satellite communication system in accordance with a preferred embodiment of the present invention. The system includes a constellation of Low Earth Orbit (LEO) satellites 210, one or more Mission Operations Control Centers (MOCCs) 220, one or more Distributed Virtual Network Managers (DVNMs) 230, and several types of Customer Premises Equipment (CPE). In a preferred embodiment, satellites are interconnected via optical inter-satellite links (ISLs) 240 to provide a global communication network infrastructure. In alternate embodiments, different types of links (e.g., RF links) could be used. In other alternate embodiments, the system could include Medium Earth Orbit (MEO) or Geostationary Earth Orbit (GEO) satellites, although LEO satellites enable the lowest transit delays to be achieved.

The architecture for the apparatus of the present invention is a traditional hierarchy of configuration items (CIs) with their associated interfaces. The first tier of the hierarchy includes the system control segment, the distributed virtual network (DVN) segment the space segment, and the CPE segment. The responsibilities of these segments are discussed in the following sections.

System Control Segment:

Satellite constellation control is performed by system control segment. In a preferred embodiment, the System Control Segment (SCS) includes two Mission Operation Control Centers (MOCCs) 220 and four Remote Antenna Facilities (RAF). The SCS facilities are desirably strategically located to provide multiple opportunities to view every satellite during each orbit. This visibility allows the SCS to rapidly and accurately determine the orbit of each satellite. It also provides many contact opportunities each day for anomaly resolution and other maintenance activities.

Figure 3:
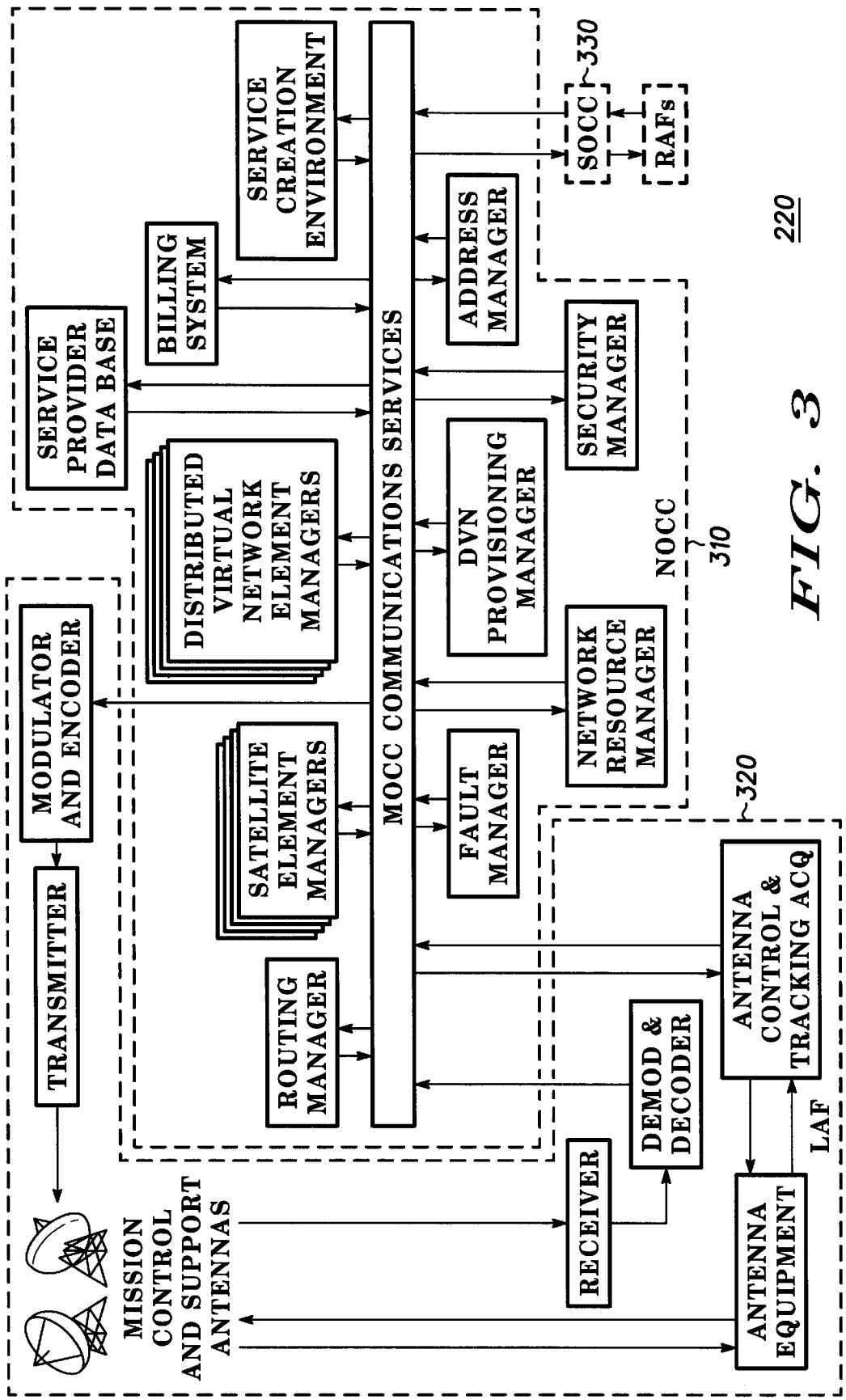
FIG. 3 illustrates a block diagram of the MOCC in accordance with a preferred embodiment of the present invention.

FIG. 3 illustrates a block diagram of the MOCC 220 in accordance with a preferred embodiment of the present invention. Control of the satellite constellation is provided by a primary MOCC and transferred to a back-up MOCC in the event of a failure in the primary. Multiple antenna sites provide line of sight tracking, telemetry and control (TTAC) communications for the satellites. In a preferred embodiment, at least one of these sites is collocated with the MOCCs and others are remote antenna facilities (RAFs). Each MOCC includes a Satellite Operations Control Center (SOCC) and a Network Operations Control Center (NOCC) 310, along with a Local Antenna Facility (LAF) 320.

SOOC 330 desirably includes the processing equipment, operator stations, software and other facilities used in the launching, control, maintenance and decommissioning of the satellites in the constellation. Satellite operations processing and communications with the constellation are accomplished from the two Satellite Operations Control Centers and the Local and Remote Antenna Facilities using communications channels and the intersatellite network for continuous access to any satellite in the constellation. Command data transfers are protected by authentication protocols to maintain constellation security. A secondary link on each satellite provides communications with the Satellite Operations Control Centers during launch and deployment operations and during contingency operations when the primary links are not available.

In a preferred embodiment, the Network Operations Control Center (NOCC) 310 includes the processing equipment, operator's stations, software and other facilities that perform the network management functions allocated to the system management domain. Preferably, a NOCC 310 is collocated with a SOCC 330 and shares the communications resources and other support facilities within the MOCC 220. The routing information contained in a look-up table is desirably updated multiple times a minute to account for the motion of the LEO satellites. The information for the table updates is predetermined by a routing management function in the NOCC 310 and block uploaded to the satellites.

In a preferred embodiment, Local Antenna Facility 320 includes five primary link antennas and one secondary link antenna, although different numbers of antennas could be used. Desirably, these antennas are mounted on two axis gimbals to provide tracking of the satellites. The Local Antenna Facilities also desirably include fixed antennas for connections between the MOCC 220 and the RAFs via satellite such as Geostationary Earth Orbit (GEO) satellites. Remote Antenna Facilities are desirably similar in design to Local Antenna Facilities.

Distributed Virtual Network Segment:

The Distributed Virtual Network Segment includes one or more Distributed Virtual Network Managers (DVNMs). Service and subscriber management for the system are controlled individually by service providers via DVNMs. The system is fully operational with one DVNM, but it is anticipated that a number of service providers will sell access to the system, and each of these providers will have a DVNM.

Figure 4:
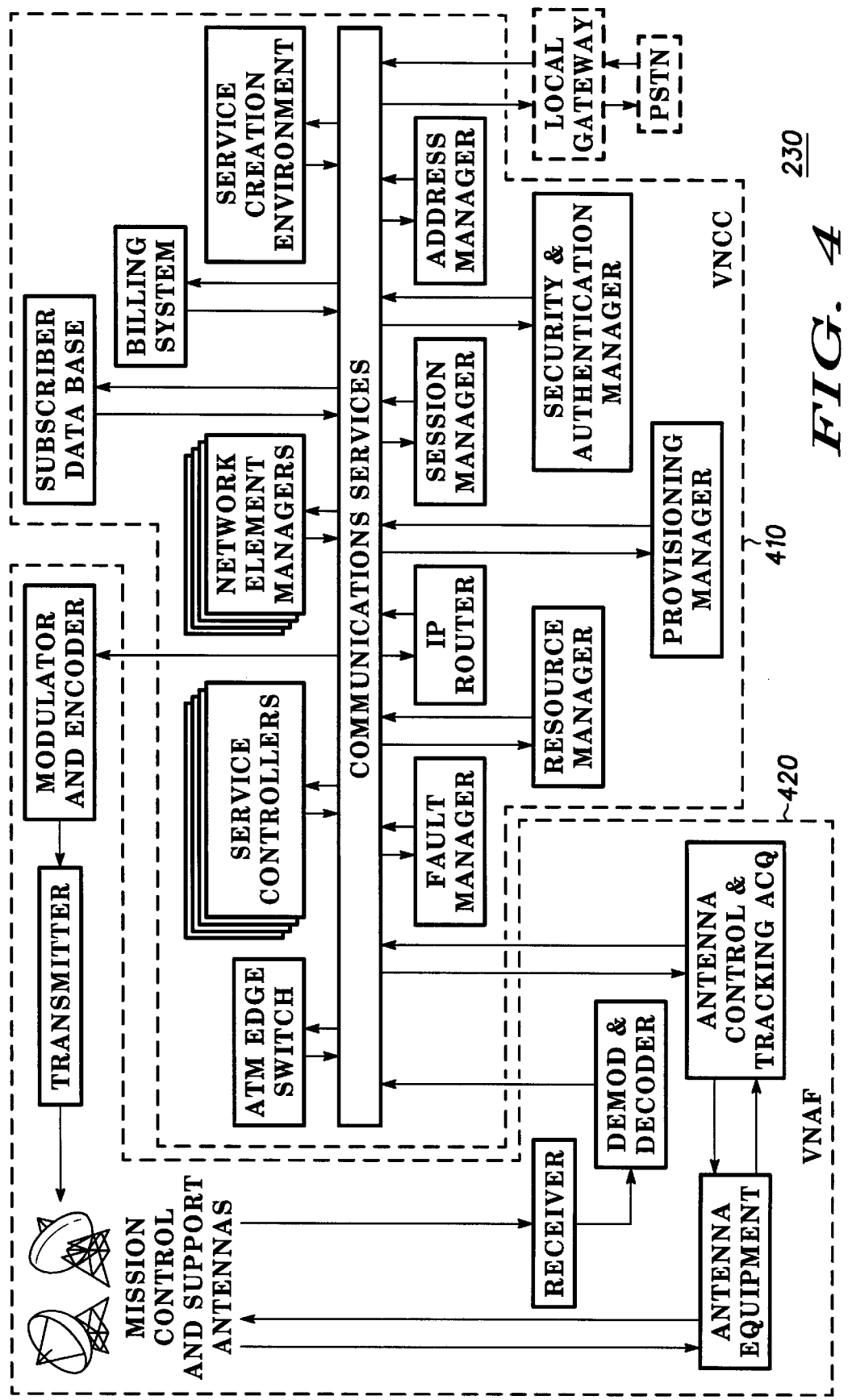
FIG. 4 illustrates a block diagram of a DVNM in accordance with a preferred embodiment of the present invention.

FIG. 4 illustrates a block diagram of a DVNM in accordance with a preferred embodiment of the present invention. Each DVNM 230 includes a Virtual Network Control Center and a Virtual Network Antenna Facility. The Virtual Network Control Center (VNCC) 410 is the processing equipment, operator's stations, software and other facilities that performs or directs the CPE in performing the functions associated with a local management domain and a DVN. The VNCC 410 includes a series of software functions such as those shown in FIG. 4.

The Virtual Network Antenna Facility (VNAF) 420 includes a number of gimbal mounted antennas that provide communications links between the constellation and the DVNM 230. In some locations, a DVNM 230 will include multiple distributed VNAFs 420 separated far enough to provide improved rain availability through site diversity. VNAFs 420 include antenna equipment, transmitters, receivers and antenna control devices such as those shown in FIG. 4.

Figure 5:
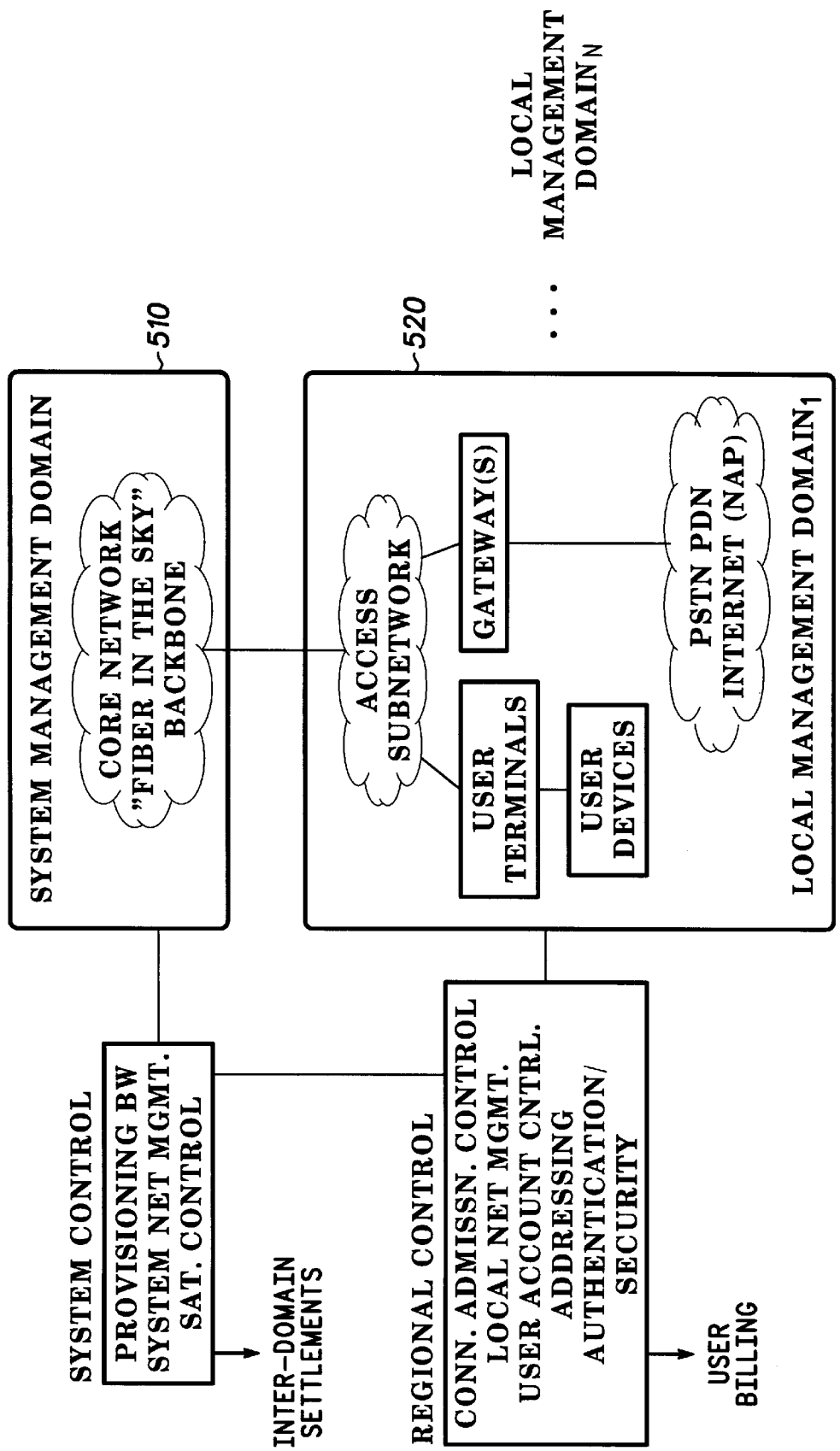
FIG. 5 illustrates a conceptual network architecture in accordance with a preferred embodiment of the present invention for supporting the business structure of FIG. 1.

FIG. 5 illustrates a conceptual network architecture in accordance with a preferred embodiment of the present invention for supporting the business structure of FIG. 1. The network includes two management domain classes: the System Management Domain (SMD) 510 and multiple Local Management Domains (LMDs) 520. Each domain has an associated subnetwork.

The SMD 510, which is under the control of the global network operator, is associated with the core network which provides the global connectivity in the method and apparatus of the present invention. Each distributor controls an LMD 520 which includes of a distributed virtual network (DVN). A large number of these LMDs 520 may exist within the system. The LMDs 520 are associated with an access subnetwork and may include an interface to the PSTN. The SMD 510 and LMD 520 are described in detail below.

System Management Domain (SMD):

The SMD is responsible for maintaining the overall status and performance of the system. It performs functions such as space system operation, network element management of the satellite nodes and distributed virtual network managers (DVNMs), system fault detection and correction, and network resource management. This domain allocates capacity to the DVNs and ensures that they have the system resources to achieve this capacity.

Local Management Domain (LMD):

Each LMD is responsible for managing the resources and subscribers associated with a DVN. These domains operate as quasi-independent networks, subject to the resource constraints imposed by the SMD. The LMDs are responsible for all subscriber and service management functions as well as network element management of all CPEs connected to their DVN. These domains are also responsible for operating in compliance with regulatory and licensing limitations and for responding to other national sovereignty concerns.

In a preferred embodiment, the management systems for the core network associated with the SMD and the DVNs associated with the LMDs are based on common network management techniques well known to those of skill in the art.

In a preferred embodiment, the LMDs perform the full range of management functions in order to manage their DVNs. The SMD only needs to perform the network and element management functions necessary to support the DVN structure.

Below is a brief description of the various functions performed by the network management levels and the responsible management domain (i.e., SMD or LMD) in accordance with a preferred embodiment of the present invention.

1) Network Resource Management Level:

The network resource management level is concerned with information that represents the network as a physical and logical whole. As such, it integrates satellite control, constellation control, mission control, telecommunications system control, information system control, network monitoring, and network reconfiguration. This level concentrates on managing the relationships and interactions of the network elements rather than the elements themselves. Since network resource management is primarily a global view of the network, it is primarily the responsibility of the SMD. Nevertheless, an LMD can also perform some of these functions for the resources allocated to its associated DVN.

2) Element Management Level:

The element management level manages separate network elements or groups of network elements. However, it does not necessarily see these network elements as being connected. It is concerned with keeping the network elements up and running and providing a uniform view to the Network Management Level. The SMD is responsible for managing the elements such as the spacecraft and network operations and control centers that make up the core network and are shared between various DVNs. The LMDs are responsible for managing the elements that are associated exclusively with their DVN, such as their subscribers' CPE.

3) Business Management Level:

Critical business management systems include billing systems, customer databases, directory services, marketing and finance systems, tax and license management systems, and management information systems (MISs). Billing systems facilitate customer charge collection and distribution. Customer databases are used by billing, marketing, finance, and management information systems for related customer information. Directory services support customer and employee Internet addressing and mail delivery. Marketing and finance systems support sales and financial forecasting as well as organizational strategies. MIS supports activities such as payroll, benefits, and human resources.

Virtually all of these systems are the responsibility of the LMD. These systems interface to the DVNM and transfer data to and from the system. In general there is no requirement for uniformity between these systems across the various DVNs. This allows individual service providers to use their existing business systems when they have them, and to have a free choice in the selection and functionality of these systems if they procure them specifically for the method and apparatus of the present invention. There could be some level of standardization imposed on the interface to these systems to enable the definition of a common CPE interface.

4) Service Management Level:

Major service management systems include provisioning systems, Service Creation Environments (SCE), configuration management systems, subscriber management systems, network security systems, session management systems, customer databases, directory services, operations center systems, and clearing house systems. Service Creation Environments (SCEs) facilitate product conceptualizing and information to support business cases. As part of service provisioning, customer negotiations are administered by product and configuration management applications that service providers complete through account and security management. Subscriber access and authentication capabilities are provided while preserving system integrity and restricting access into the system network management functions. The subscriber databases and directory services support the service and session management level. New services and products are produced and simulated through a service creation environment in a customer independent way. Clearing house systems perform billing services for service providers Control of service sessions is performed through connection establishment and maintenance, resource provisioning and configuration, performance and fault management, accounting and billing data collection, and security management applications. Network security functions such as user authentication, data integrity and access control are included in session management, but data privacy falls into the application domain. Operations like observing, deleting, validating, and collecting service measurements are performed through monitoring to support billing, accounting, and security management.

Similar to business management, service and session management are almost entirely within the purview of the LMDs. The SMD is responsible for the cell relay service provided by the core subnetwork and for communications and security services used to support the element and resource management level functions of that domain.

The above discussion of network management functions and the management domains responsible for the performance of those functions illustrates how the method and apparatus of the present invention enables individual service providers to control their network services independently from other service providers. Thus, from the service provider's perspective, the system appears to be a virtual network for which the service provider can control system functions such as security, subscriber access, routing, addressing, and offered services.

Space Segment:

Referring back to FIG. 2, in a preferred embodiment, the constellation includes of 63 satellites at a nominal altitude of 1400 kilometers, although a different number of satellites at different altitudes could be used in alternate embodiments. The preferred constellation is configured with 7 orbital planes inclined at 48 degrees. In a preferred embodiment, each system satellite projects a plurality of uplink antenna beams and downlink antenna beams.

The satellites provide the physical resources that create the core network and establish the global connectivity of the method and apparatus of the present invention. In a preferred embodiment, intersatellite communication links (ISLs) are supported by full-duplex laser communications between each satellite and six neighboring satellites. In alternate embodiments, ISLs could be RF links. Each ISL may use a combination of wavelength and time division multiplexing with each time slot capable of transporting one data cell. In a preferred embodiment, the method and apparatus of the present invention uses a table look-up at each satellite node to determine which intersatellite link (ISL) should be used as the next leg of a particular cell's route.

Figure 6:
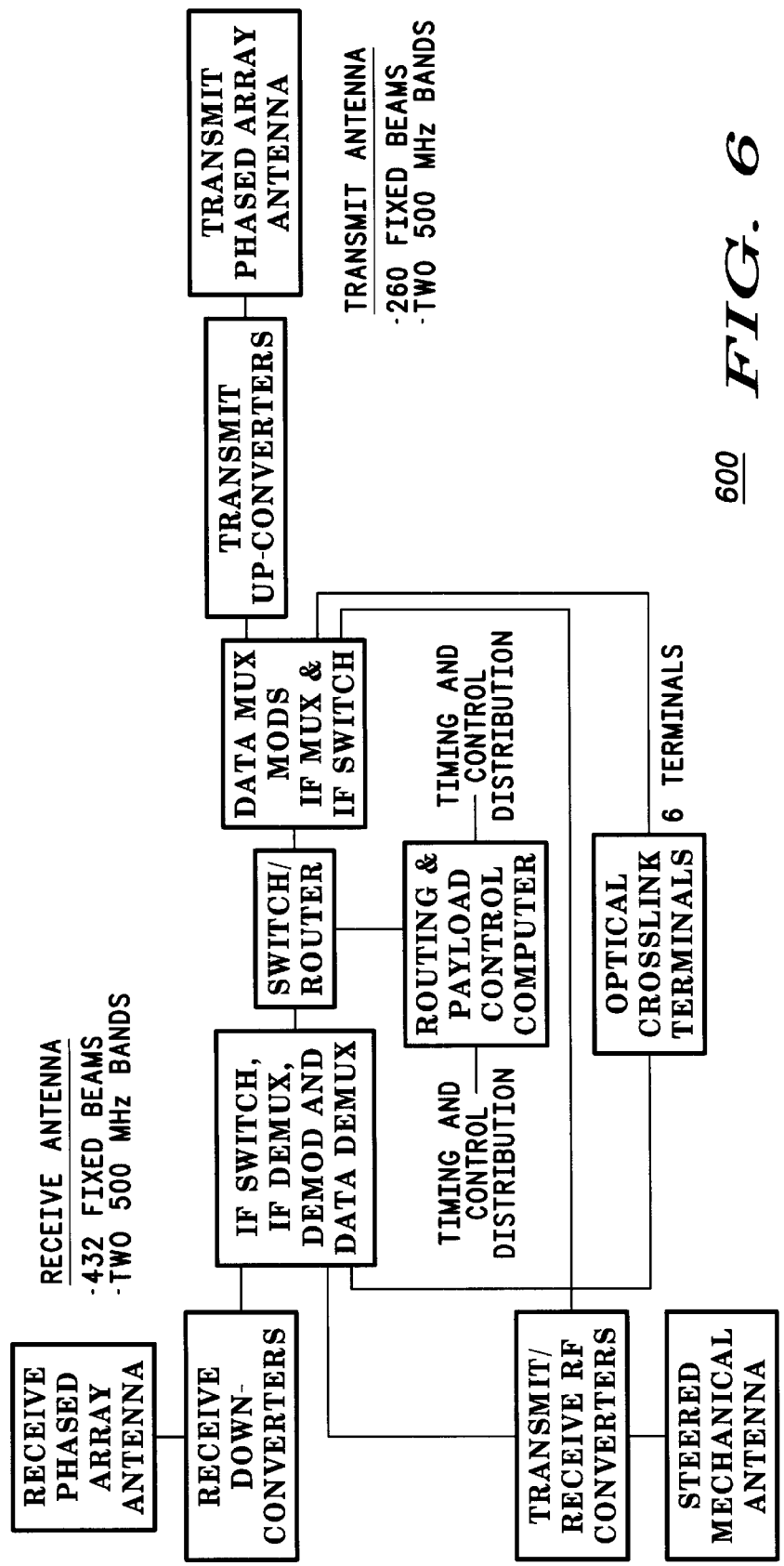
FIG. 6 illustrates a satellite payload in accordance with a preferred embodiment of the present invention.

FIG. 6 illustrates a satellite payload 600 in accordance with a preferred embodiment of the present invention. Uplink and downlink demodulators supply uplink and downlink data to the switch. In a preferred embodiment, the payload also includes a number (e.g., six) optical intersatellite link terminals, although a different number of different types of links operating at different peak rates could also be used in alternate embodiments.

In a preferred embodiment, subscriber links use burst mode TDMA, overlaid with a DAMA protocol. Multiple CPEs share the same uplink frequency on these links on a demand assigned or a circuit switched basis, depending on the service characteristics selected by the CPE when a session is established. All other links in the system use a TDM format where only one data link transmitter is assigned to a particular frequency access. That source, however, can multiplex data cells from various sources onto the frequency access. Also, in case of the downlinks, many CPEs may receive data from a particular data link.

Customer Premise Equipment (CPE):

The CPE segment provides the subscriber interfaces to the system and also supports a variety of network management functions for the associated DVN. The following four CPE terminals illustrate system terminals in accordance with a preferred embodiment.

Figure 7:
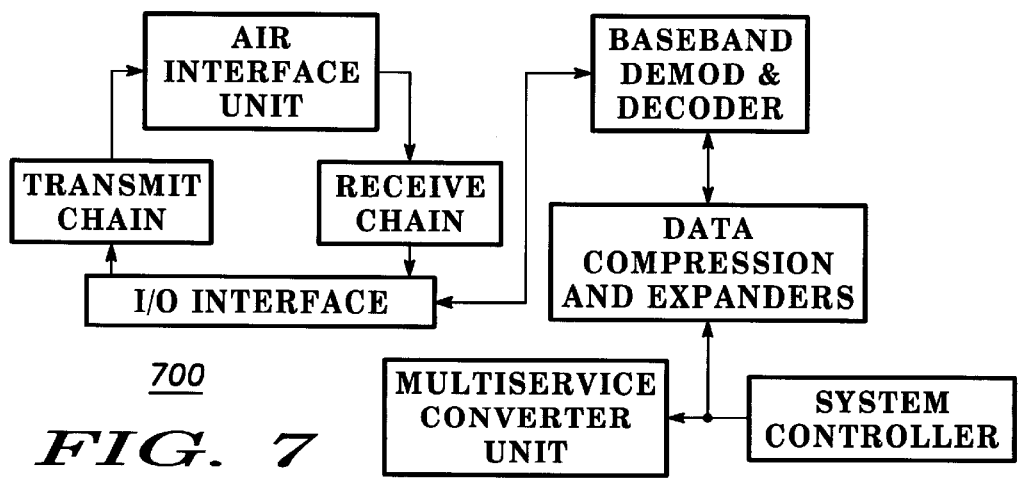
FIG. 7 illustrates a gateway terminal architecture block diagram in accordance with a preferred embodiment of the present invention.

1) Gateway Terminal: The gateway terminal provides an interface to the PSTN. In a preferred embodiment, gateway terminals are available to connect at OC-1 rates (51.84 Mbps) and at OC-3 rates (155.52 Mbps), although other rates also could be supported. FIG. 7 illustrates a gateway terminal 700 architecture block diagram in accordance with a preferred embodiment of the present invention.

2) Corporate Terminal: The corporate terminal provides access for enterprise networking and provisioned private lines at an OC-1 rate. The architecture of a corporate terminal is substantially the same as the architecture for a gateway terminal in a preferred embodiment of the present invention.

3) Small Business Terminal: The small business terminal is a VSAT class terminal designed to provide a variety of services for small businesses. The architecture of a corporate terminal is substantially the same as the architecture for a gateway terminal in a preferred embodiment of the present invention.

Figure 8:
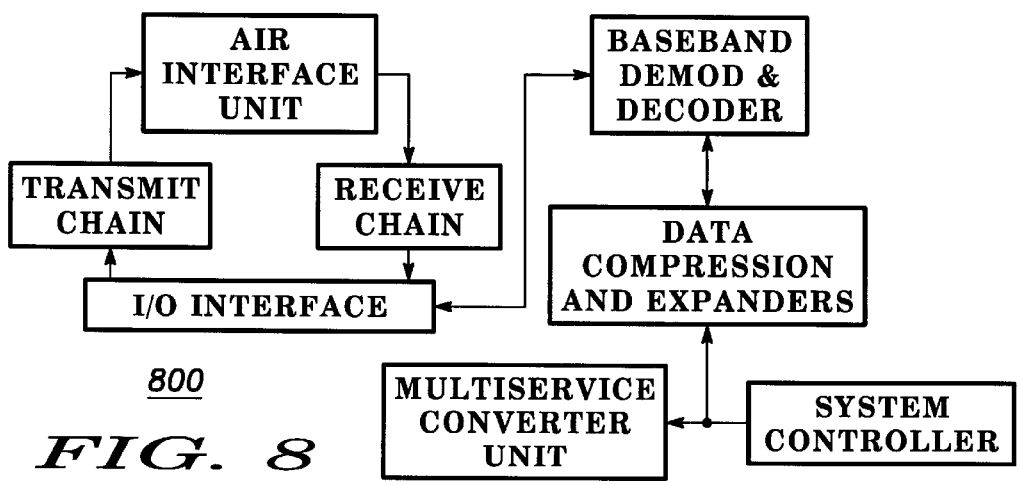
FIG. 8 illustrates a direct to home terminal architecture block diagram in accordance with a preferred embodiment of the present invention.

4) Direct to Home Terminal: The direct to home terminal is an Ultra Small Satellite Terminal designed to provide multimedia and telecommuting services to the home. FIG. 8 illustrates a direct to home terminal 800 architecture block diagram in accordance with a preferred embodiment of the present invention.

A preferred embodiment of the present invention has been described as including LEO satellite network. Those of skill in the art will appreciate that the distributed virtual networking concept of the present invention is not dependent upon the type of network (e.g., satellite or terrestrial) in which the invention is practiced. Thus, in an alternate embodiment, the method and apparatus of the present invention could also be practiced in a terrestrial network, for example. In alternate embodiments, the network could utilize MEO or even GEO satellites. The apparatus of the present invention could be used as a stand-alone network, or could be one tier of a multi-tier network, for example.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for operating a satellite communication system, the method comprising the steps of:

(a) providing in said satellite communication system a system management domain segment for controlling a core global satellite network, the core global satellite network comprising means for providing bandwidth-on-demand services and a local management domain segment comprising multiple local management domains;

(b) providing in a first local management domain of said local management domain segment at least one distributed virtual network (DVN);

(c) adapting said first local management domain to enable said at least one DVN to access said core global satellite network such that said at least one DVN appears to operate as an independent global satellite network, thereby allowing a service provider associated with the at least one DVN to provide an individual DVN user a bandwidth-on-demand service through the at least one DVN as if the at least one DVN were an independent global satellite network;

(d) adapting said system management domain segment to perform a first set of functions to support said local management domain segment by allocating capacity for said bandwidth-on-demand service to said at least one DVN and ensuring that said at least one DVN has the system resources to achieve said capacity without performing a second set of functions associated with managing the use of said capacity on behalf of individual users by said at least one DVN;

step (c) comprises the step of adapting said system management domain segment to perform a set of network element management domain functions needed to support a structure of said local management domain segment; and said set of network element management domain functions comprises cell relay services.

2. The method as claimed in claim 1, wherein step (b) comprises the step of adapting said first local management domain to perform said second set of functions associated with managing said at least one DVN.

3. The method as claimed in claim 2, wherein said second set of functions comprises a function of managing a set of network elements associated with said at least one DVN.

4. The method as claimed in claim 2, wherein said second set of functions comprises a function of managing a set of business systems associated with said at least one DVN.

5. The method as claimed in claim 4, wherein said set of business systems comprises a billing system for customer charge collection and distribution.

6. The method as claimed in claim 4, wherein said set of business systems comprises a service controller system adapted to support electronic mail delivery and receptions and Internet addressing.

7. The method as claimed in claim 2, wherein said second set of functions comprises a function of service management, and wherein said function of service management comprises a subset of functions selected from the group of functions consisting of system provisioning, service creation, configuration management, subscriber management, network security, session control, customer database management, directory services, operations services, and clearing house services.

8. The method as claimed in claim 1, wherein said set of network element management domain functions comprises a function of management of interaction of individual network elements.

9. The method as claimed in claim 1, wherein said set of network element management domain functions comprises a function of management of resources of said system management domain segment of said communication system.

* * * * *